United States Patent [19]

Sawada et al.

[11] Patent Number: 5,250,183
[45] Date of Patent: Oct. 5, 1993

[54] APPARATUS FOR MANUFACTURING ULTRA-PURE WATER

[75] Inventors: Hidetaka Sawada; Shoichi Momose; Shiro Inoue; Hideo Suematsu; Kazunori Koba, all of Osaka, Japan

[73] Assignee: Hitachi Zosen Corporation, Osaka, Japan

[21] Appl. No.: 751,806

[22] Filed: Aug. 30, 1991

[51] Int. Cl.$^5$ .............................................. B01D 61/00
[52] U.S. Cl. .................... 210/652; 210/195.2; 210/257.2; 210/180; 210/181; 210/900; 210/750
[58] Field of Search ............... 210/652, 900, 180, 181, 210/195.2, 750, 260, 257.2; 202/174, 176; 261/153

[56] References Cited

U.S. PATENT DOCUMENTS

| | | |
|---|---|---|
| 3,901,768 | 8/1975 | Steinbruchel . |
| 3,968,002 | 7/1976 | Standiford ..................... 202/174 |
| 4,344,826 | 8/1982 | Smith ............................. 210/652 |
| 4,795,532 | 1/1989 | Mizutani et al. ................ 210/750 |

FOREIGN PATENT DOCUMENTS 0254519 1/1988 European Pat. Off. .
3243817 7/1984 Fed. Rep. of Germany ...... 210/652

OTHER PUBLICATIONS

Patent Abstracts of Japan, vol. 14, No. 242 (C-721) 23 May 1990 & JP-A-2 063 592 (Hitachi Ltd.).
Patent Abstracts of Japan, vol. 10, No. 269 (C-372) 12 Sep. 1986 & JP-A-61 093 897 (Hitachi Zosen Corp.).
Patent Abstracts of Japan, vol. 10, No. 339 (C-385) 15 Nov. 1986 & JP-A-61 141 985 (Mitsubishi Heavy Ind. Ltd.).

Primary Examiner—Robert A. Dawson
Assistant Examiner—Ana M. Fortuna
Attorney, Agent, or Firm—Armstrong, Westerman, Hattori, McLeland & Naughton

[57] ABSTRACT

The present invention provides an apparatus for manufacturing ultra-pure water, characterized in that a decarbonator/degassor and a reverse osmosis equipment for pretreatment of supply water are installed in the upper stream of a multiple effect evaporator. The present invention also provides a method for manufacturing ultra-pure water, characterized in that most of the carbonic groups dissolved in the supply water is degassed by a decarbonating/degassing treatment prior to introducing the water to the multiple effect evaporator, and that most of the scale components such as $Ca^{++}$, $SO_4^{--}$ and $Mg^{++}$ are also eliminated by a reverse osmosis treatment.

11 Claims, 3 Drawing Sheets

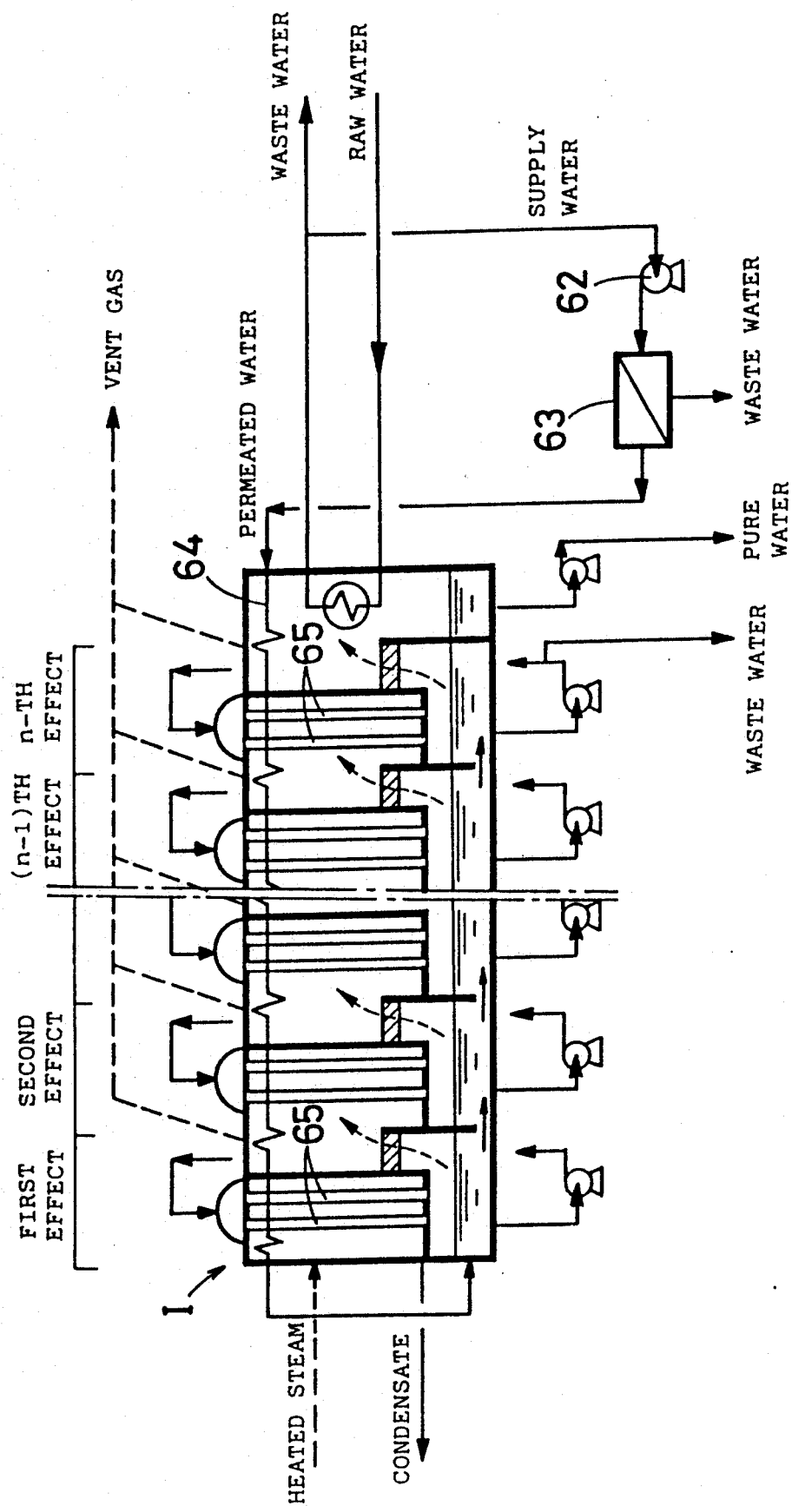

APPARATUS FOR MANUFACTURING ULTRA-PURE WATER

FIELD OF THE INVENTION

The present invention relates to an apparatus for manufacturing ultra-pure water to be used, for example, in electronic industries such as semiconductor industries and the like.

DESCRIPTION OF THE PRIOR ART

Electronic industries such as semiconductor industries and the like require purified water of extremely high degree in recent years. While industrial water, city water, well water or the like is used as raw water for the purified water, suspended materials, electrolytes, fine particles, microorganisms, organic substances and dissolved gases are contained in the raw water in an large amount in excess of the value regulated in the water quality standard. Therefore, these impurities must be eliminated.

The methods illustrated in FIG. 2 and FIG. 3 have been used in the prior art to manufacture ultra-pure water by eliminating the above-mentioned impurities.

Referring to FIG. 2, raw water passes through a heat exchanger pipe in a condenser (51) built in an evaporator (I), and the water is heated by receiving a latent heat of condensation of water vapor generated in an evaporator pipe (56) at the final n-th effect. Part of the heated raw water is supplied to a decarbonator/degassor (52) as supply water, pH value of it being lowered to 4 or less by adding an acid. As a consequence, ions ($HCO_3^-$, $CO_3^{--}$) dissolved in the supply water are converted into ($H_2O + CO_2$) and carbon dioxide gas is degassed from the raw water together with volatile gasses like oxygen dissolved in the supply water when the supply water is introduced into the decarbonator/degassor (52). The degassed supply water is sent into a pre-heating pipe (54) in the evaporator (I) by using a pump (53), flowing through the pipe and finally being heated to a predetermined temperature. The pre-heated supply water is mixed with the condensate from the first effect and the mixture is sent into an evaporator pipe (56) in the first effect downward by a circulation pump (55) via a circulation pipe (57). The water evaporates by receiving a latent heat of condensation of the heated steam supplied to the outer face of the pipe, thereby generating water vapor. The generated water vapor passes through a mis-separator (58) to eliminate accompanying mists there, flows into the outer part of an evaporator pipe (56) at the second effect and condensates on the outer surface of the pipe. After the repetition of these processes of evaporation and condensation, pure water is finally taken out from the evaporator (I) by a pure water pump (59) from a reservoir (60) at the lowest temperature part of the evaporator (I).

In this process, deposition of scales comprising $CaCO_3$ and $Mg(OH)_2$ on the pre-heating pipe (54) and the evaporator pipe (56) by heating the supply water in the evaporator (I) could be prevented from occurring because the water was subjected to decarbonation/degassing process prior to entering the evaporator (I). Occurrence of scales from $CaSO_4$ was not able to be prevented, however, by the decarbonation treatment only and hence the maximum heating temperature of the supply water to the first effect was kept at 125° C. or less, thereby lowering heat efficiencies at the evaporator. When the supply water was heated at a temperature of more than 125° C., scales comprising $CaSO_4$ precipitated on heat-exchanger pipes as described above. Operation of the apparatus was forced to stop temporarily to eliminate them by pickling or mechanical cleaning of the heat exchanger pipes, thereby causing an expensive maintenance cost.

An evaporator illustrated in FIG. 3 was proposed to improve the problems in the evaporator shown in FIG. 2. In this apparatus, the supply water was introduced into a reverse osmosis equipment (63) by using a pump (62) to eliminate most of the ionic substances such as $HCO_3^-$, $CO_3^{--}$, $Ca^{++}$ and $SO_4^{--}$ which were to be components of scales, before the treated water was supplied to the evaporator. Thus, the apparatus was improved in that the supply water was able to be heated at above 125° C. without causing scales such as $CaCO_3$, $Mg(OH)_2$ and $CaSO_4$ to appear on a pre-heating pipe (64) and an evaporator pipe (65), and the heat-exchange areas of the evaporators (I) could be made small, thereby making the condenser (I) itself compact. Since very small amount of $HCO_3^-$ and $CO_3^{--}$ could not be eliminated by the reverse osmosis equipment (63), however, these remaining components of $HCO_3^-$ and $CO_3^{--}$ were converted to carbon dioxide gas in the evaporator (I) due to heat decomposition. The above-described remaining ions redissolve into the condensed liquid during the process of condensation of the water vapor generated in the evaporator (I) on the outer surfaces of the evaporator pipe (65) and the pre-heating pipe (64), thereby decreasing specific electric resistivity of the condensed liquid and making it impossible to collect ultra-pure water having electric resistivity of, for example, $17 M\Omega \cdot cm$ or more at the outlet of the evaporator. Sedimentation of impurities on the surface of the reverse-osmotic membrane or time-dependent deteriorations of the membrane sometimes made it impossible to eliminate $HCO_3^-$ and $CO_3^{--}$ below an expected level, which gave another problem of decreasing specific electric resistivity.

SUMMARY OF THE INVENTION

The object of the present invention is to provide an apparatus for manufacturing ultra-pure water which can solve all the problems in the prior art.

According to the invention, an apparatus for manufacturing ultra-pure water is provided, characterized in that a decarbonator/degassor and a reverse osmosis equipment for pre-treatment of the supply water are installed at the upper-stream of a multiple effect evaporator.

Either of the decarbonator/degassor or reverse osmosis equipment can be installed at the upper-stream as an order of the installation.

According to the invention, a method for manufacturing ultra-pure water is provided, characterized in that, prior to supplying the water to the multiple effect evaporator, the supply water is subjected to decarbonation/degassing treatment to degas most of the carbonate groups remaining in the supply water, followed by a reverse osmosis treatment to eliminate most of $Ca^{++}$, $SO_4^{--}$ and $Mg^{++}$ which are the components of the scale in the supply water.

An acid is added, preferably during the decarbonator/degassor treatment or at the upper stream of the treatment, to the supply water to keep the pH value of the water at 4 or less in the present method.

In the present method, an alkali is also added, preferably at the down stream of the decarbonator/degassor treatment and at the upper stream of the multiple effect evaporator, to keep the pH value of the supply water in the range from 7 to 8.

The invention comprising the above-described steps his characteristics or effects as follows; since a decarbonator/degassor for pretreatment of the supply water and a reverse osmosis equipment are installed in the upper stream of the multiple effect evaporator, it is possible to degas most of the carbonate groups dissolved in the supply water by means of the decarbonator/degassor, and to eliminate most of $Ca^{++}$, $SO_4^{--}$ and $Mg^{++}$ which are the scale components in the supply water by means of the reverse osmosis equipment. Consequently, re-dissolution of carbon dioxide gas which is generated by a heat-decomposition of the carbonate groups in the evaporator can be suppressed effectively and ultra-pure water with an extremely high purity can be collected. Moreover, the supply water can be heated at a temperature of more than 125° C. without suffering to sedimentation of scales such as calcium sulfate or the like, thereby making the evaporator compact and reducing the maintenance expenses.

Since no uses of ion exchange resins or demineralizers are required and many processing devices are not combined in the apparatus, constitutions of the apparatus is made simple and therefore monitoring of the operation or maintenance and management of the system are made easy.

BRIEF DESCRIPTION OF THE DRAWINGS

FIG. 2 and FIG. 3 are flow sheets showing the examples in the prior art.

DESCRIPTION OF THE PREFERRED EMBODIMENTS

The present invention is described in detail referring to the examples.

Figure 1:
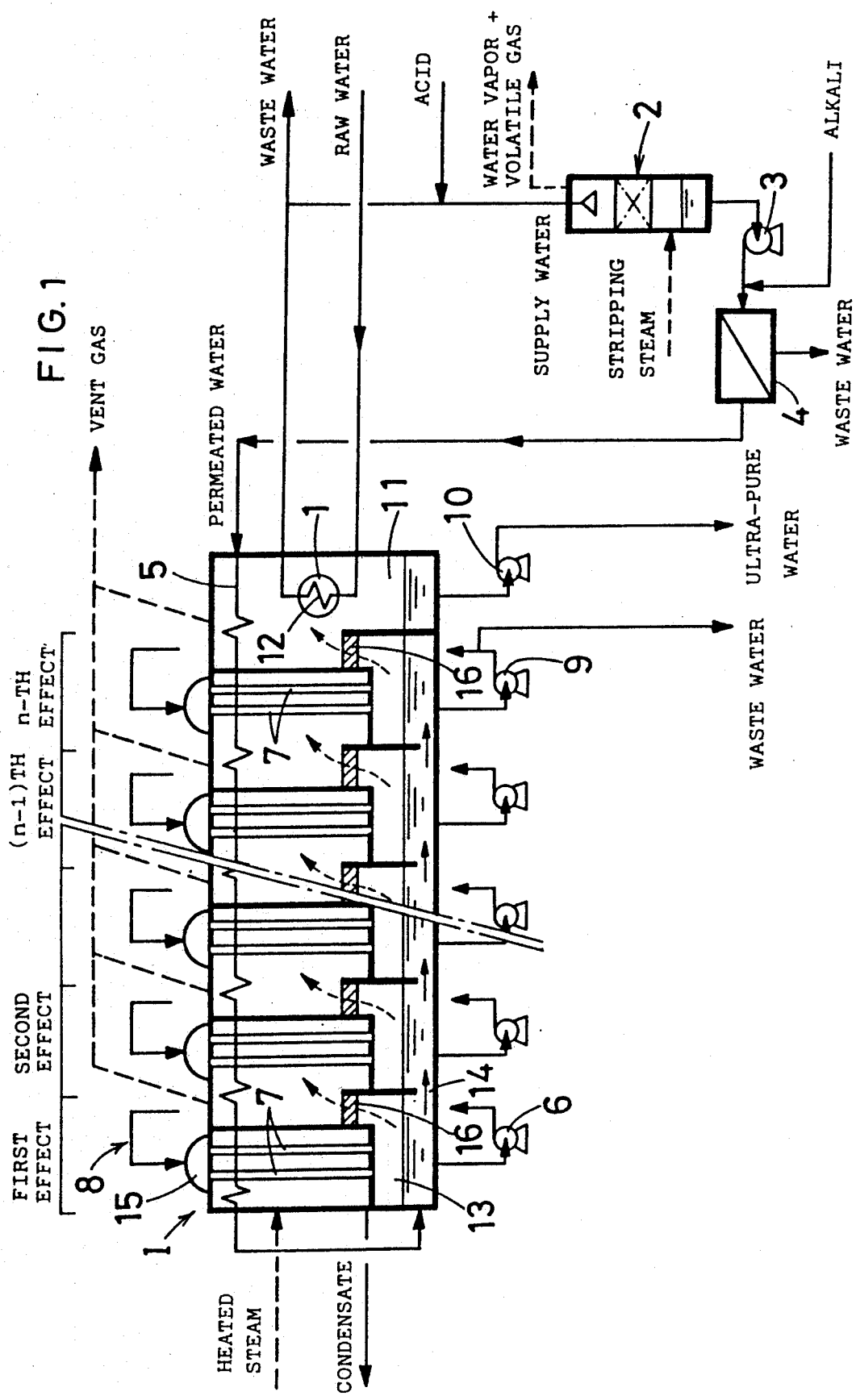
FIG. 1 is a flow sheet showing an example of the invention.
Figure 2:
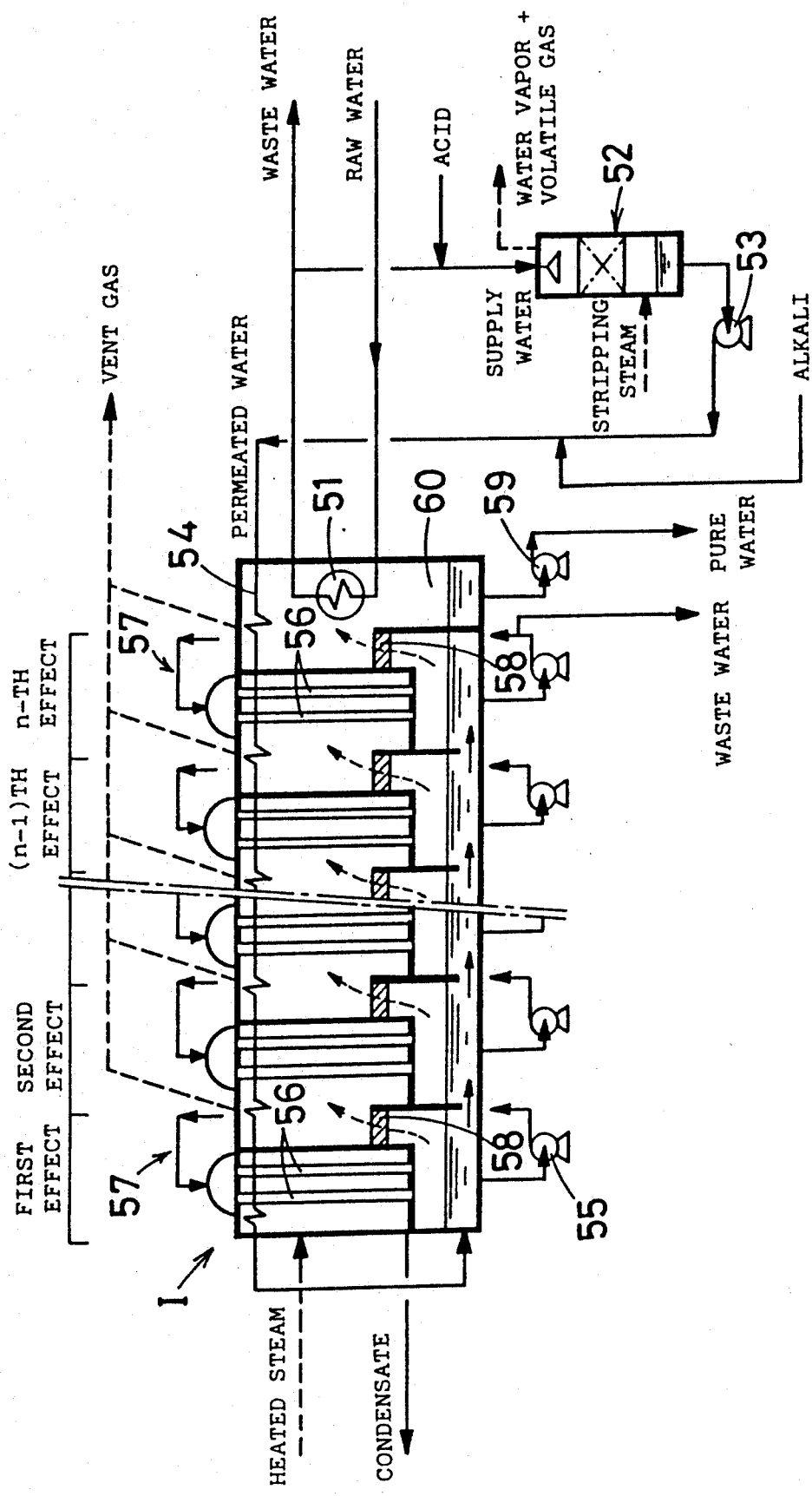

In FIG. 1, raw water such as industrial water, city water or the like passes through a heat exchanger pipe (12) in a condenser (1) built in an evaporator (I) and the water is heated at a predetermined temperature by receiving a latent heat of condensation generated in an evaporation pipe (7) at the n-th effect. A part of the heated raw water is supplied to a decarbonator/degassor (2) as supply water. A mineral acid, sulfuric acid for example, is added to the supply water in the upper stream of the decarbonator/degassor (2) to keep the pH value of the supply water at 4 or less. Water vapor for stripping is introduced to the bottom of the decarbonator/degassor (2), which flows upwards by making contact with the supply water and flows out from the top of the equipment. Ions such as $HCO_3$ and $CO_3$ dissolved in the supply water exist in the form of $(H_2O + CO_2)$ because pH value of the water is made below 4, and carbon dioxide is degassed by the water vapor together with volatile gases dissolved in the supply water from the decarbonator/degassor (2), thereby eliminating the carbon dioxide gas in the supply water at the outlet of the decarbonator/degassor (2) to an extremely low level.

The supply water taken out from the decarbonator/degassor (2) by a pump (3), which has a possibility to corrode metallic materials constituting the evaporator when the intact water is supplied to the evaporator, is supplied to a reverse osmosis equipment (4) after adding an alkali such as sodium hydroxide to raise the pH value of the water from 4 to about 7 to 8. Most of the ions such as $Ca^{++}$ and $SO_4^{--}$, which are dissolved in the supply water as components to form scales, are eliminated by the reverse osmosis equipment (4).

The permeated water is supplied to a pre-heating pipe (5) penetrating each effect in the evaporator (I), heated by receiving a part of latent heat of condensation from the water vapor generated in an evaporator pipe (7) in each effect and heated also at a predetermined temperature of more than 125° C. by receiving a part of the latent heat of condensation of the heated water vapor in the preheating pipe (5) of the first effect. Finally the water is introduced into a water trap (13) at the bottom of the first effect. The supply water in the water trap (13) is mixed with the remaining condensate after generating water vapor in the evaporator pipe (7), and most of the mixed liquid is supplied to an upper water chamber (15) attached to the upper portion of the first effect via a circulating pump (6). The water flows down in the vertically installed evaporation pipe (7) forming a thin film of the liquid and evaporates at a temperature of more than 125° C. by receiving most of the latent heat of condensation of the heated steam from outside of the pipe, whereby generating water vapor. The condensate, after generating the water vapor, flows down to the water trap (13) and is mixed with the supply water as described before and most of the mixed water is sent into the upper water chamber (15) via the circulation pump (6). The remaining mixed liquid is introduced into a water trap (13) at the second effect through a communication port (14), where the liquid is mixed with condensate flowing down from the evaporator pipe (7) in the same manner as described before. Most of the mixed liquid described above is sent into the upper water chamber (15) at the upper part of the second effect.

The water vapor generated in the evaporator pipe (7) at the first effect is introduced to the outer part of the evaporator pipe (7) at the second effect via a mist separator (16), where most of the mist is eliminated by the mist separator (16) so that the mist accompanied by the steam is made extremely small. Most of the water vapor condenses on the outer surface of the evaporator pipe (7) and the condensate is introduced into a condensate collector (not shown in the figure) of the second effect. The remaining water vapor condenses on the outer surface of the pre-heating pipe (5) of the second effect and the condensate is mixed with the condensate from the evaporator pipe (7) in the condensate collector, where all the combined condensate is introduced into a condensate collector of the third effect.

As described above, the amount of the carbon dioxide gas generated in the evaporator pipe (7) and the pre-heating pipe (5) is very small, re-dissolution of the carbon dioxide gas on the outer surface of the evaporator pipe (7) and the pre-heating pipe (5) is suppressed effectively and therefore the condensate in the condensate collector is ultra-pure water with extremely high purity, because most of the ions in the supply water are eliminated by the reverse osmosis apparatus (4), most of the mists which contain impurities and are accompanied by a generated steam are eliminated by the mist separator (16) and hence the generated steam is made almost pure water vapor, and because the supply water is treated by the decarbonator/degassor (2) to make the content of the carbonic groups in the supply water extremely small.

The above-described processes are repeated at each effect, and finally the condensate is collected as ultra-pure water by using an ultra-pure water pump from the water collector (11) at the lower part of the condenser (1) situated very close to the n-th effect of the evaporator.

The supply water is treated by the reverse osmosis apparatus (4) after subjecting to a treatment by the decarbonator/degassor (2) in the example. However, the order of the treatment can be reversed with that described above.

Injection of an alkali such as sodium hydroxide is made to the supply water prior to introducing the supply water to the reverse osmosis apparatus, but it may be injected to the permeated water.

The circulating liquid is evaporated by flowing it downward in the form of liquid film on the inner surface of the evaporator pipe (7) in the multiple effect evaporator. However the invention is not limited by the method but the liquid can flow upward and be evaporated inside the evaporator pipe (7). Another evaporator in which the treated supply water is evaporated by flowing it on the outer surface of a horizontal heat exchange pipe. A thermocompression method can be also adopted in the multiple effect evaporators.

What is claimed is:

1. An apparatus for manufacturing ultra-pure water having an electric resistivity of at least 17MΩ·cm, the apparatus comprising:
    means for supplying water;
    means for purifying said supplied water to an electric resistivity of at least 17MΩ·cm; and
    means for collecting said purified water;
    wherein said means for purifying comprises:
        a decarbonator/degassor for removing most of carbonic groups dissolved in the supplied water;
        reverse osmosis equipment in fluid communication with said decarbonator/degassor and for eliminating most of scales in the supplied water, said decarbonator/degassor is disposed upstream of said reverse osmosis equipment; and
        a multiple effect evaporator, said decarbonator/degassor and said reverse osmosis equipment are disposed upstream of said multiple effect evaporator.

2. The apparatus of claim 1, further comprising acid supply means disposed upstream from said decarbonator/degassor, said acid supply means for supplying acid to said supplied water to maintain a pH value of the supplied water at 4 or less.

3. The apparatus of claim 1, further comprising alkali supply means disposed downstream from said decarbonator/degassor and upstream from said multiple effect evaporator, said alkali supply means for supplying an alkali to said supplied water to increase the pH of said supplied water to within a ph range of 7 to 8.

4. The apparatus of claim 2, further comprising alkali supply means disposed downstream from said decarbonator/degassor and upstream from said multiple effect evaporator, said alkali supply means for supplying an alkali to said supplied water to increase the pH of said supplied water to within a pH range of 7 to 8.

5. A method for manufacturing ultra-pure water having an electric resistivity of at least 17MΩ·cm, the method comprising:
    supplying water;
    purifying said supplied water to an electric resistivity of at least 17MΩ·cm; and
    collecting said purified water;
    wherein the purifying step comprises:
        decarbonating/degassing the supplied water to remove most of carbonic groups dissolved in the supplied water;
        purifying the water by reverse osmosis with reverse osmosis equipment in fluid communication with said decarbonator/degassor to remove most of scales in the supplied water, said decarbonator/degassor is disposed upstream of said reverse osmosis equipment; and
        evaporating and condensing the supplied water in a multiple effect evaporator, said decarbonator/degassor and said reverse osmosis equipment are disposed upstream of said multiple effect evaporator.

6. The method of claim 5, further comprising supplying acid to said supplied water upstream from the decarbonator/degassor to maintain a pH value of the supplied water at 4 or less.

7. The method of claim 6, further comprising supplying an alkali to the supplied water downstream from said decarbonator/degassor and upstream from said multiple effect evaporator to increase the pH of said supplied water to within a pH range of 7 to 8.

8. The method of claim 5, further comprising supplying an alkali to the supplied water downstream from said decarbonator/degassor and upstream from said multiple effect evaporator to increase the pH of said supplied water to within a pH range of 7 to 8.

9. The method of claim 5, wherein said reverse osmosis eliminates most $Ca^{++}$, $SO_4^{--}$, and $Mg^{++}$ present in said supplied water.

10. An apparatus for manufacturing ultra-pure water having an electric resistivity of at least 17 MΩ·cm, the apparatus comprising:
    means for supplying water;
    means for purifying said supplied water to an electric resistivity of at least 17 MΩ·cm; and
    means for collecting said purified water;
    wherein said means for purifying water comprises:
        a decarbonator/degassor for removing most of carbonic groups dissolved in the supplied water;
        reverse osmosis equipment in fluid communication with said decarbonator/degassor for eliminating most of scales in the supplied water, said decarbonator/degassor is disposed upstream of said reverse osmosis equipment;
        a multiple effect evaporator, said decarbonator/degassor and said reverse osmosis equipment are disposed upstream of said multiple effect evaporator; and
        alkali supply means disposed downstream from said decarbonator/degassor and upstream from said multiple effect evaporator, said alkali supply means for supplying an alkali to said supplied water to increase the pH of said supplied water to within a pH range of 7–8.

11. A method for manufacturing ultra-pure water having an electric resistivity of at least 17 MΩ·cm, the method comprising:
    supplying water;
    purifying said supplied water to an electric resistivity of at least 17 MΩ·cm; and
    collecting said purified water;
    wherein the purifying step comprises:

decarbonating/degassing the supplied water to remove most of carbonic groups dissolved in the supplied water;

purifying the water by reverse osmosis with reverse osmosis equipment in fluid communication with said decarbonator/degassor to remove most of scales in the supplied water, one of said decarbonator/degassor and said reverse osmosis equipment is disposed upstream of the other;

evaporating and condensing the supplied water in a multiple effect evaporator, said decarbonator/degassor and said reverse osmosis equipment are disposed upstream of said multiple effect evaporator; and supplying an alkali to the supplied water downstream from said decarbonator/degassor and upstream from said multiple effect evaporator to increase the pH of said supplied water to within a pH range of 7 to 8.

* * * * *